H. D. PEASLEE.
PNEUMATIC TIRE.
APPLICATION FILED FEB. 10, 1914.
1,181,540.
Patented May 2, 1916.
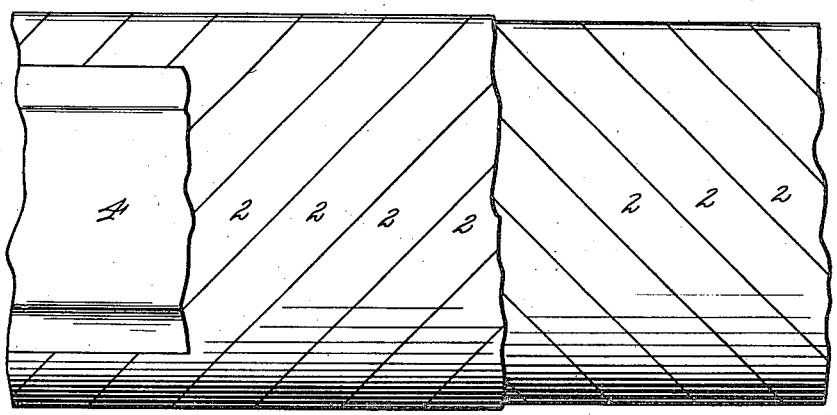
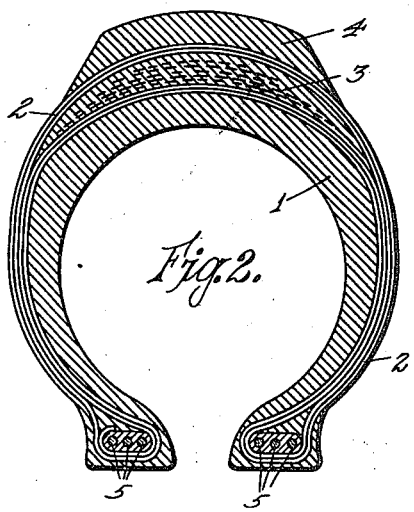
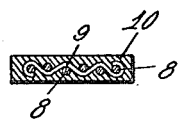
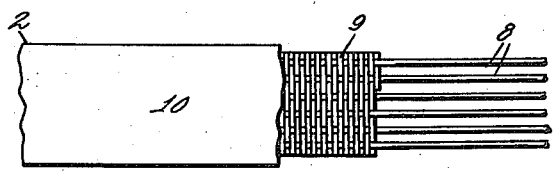
WITNESSES:
F. J. Simney.
A. H. Kephart.
INVENTOR.
H. D. PEASLEE.
BY
Carlos P. Griffin
ATTORNEY.

UNITED STATES PATENT OFFICE.

HUGH D. PEASLEE, OF FRESNO, CALIFORNIA.

PNEUMATIC TIRE.

1,181,540. Specification of Letters Patent. Patented May 2, 1916.

Application filed February 10, 1914. Serial No. 817,777.

*To all whom it may concern:*

Be it known that I, HUGH D. PEASLEE, a citizen of the United States, residing at Fresno, in the county of Fresno and State of California, have invented a new and useful Pneumatic Tire, of which the following is a specification in such full and clear terms as will enable those skilled in the art to construct and use the same.

This invention relates to pneumatic tires and its object is to give greater wearing strength to such tires without decreasing their resiliency.

Another object of the invention is to produce a tire of such a material as will not be affected by heat in the vulcanization process.

Another object of the invention is to produce a tire which will be practically puncture proof because of the great tensile strength of the tapes making up the body of the tire.

An embodiment of the invention is shown in the drawing, in which the same reference numeral is applied to the same portion throughout.

Figure 1 is a plan view of a portion of the tire, portions thereof being broken away for purposes of illustration, Fig. 2 is a cross sectional view of the tire, Fig. 3 is a transverse sectional view of the tape used in forming the tire, and Fig. 4 is a plan view of the tape used in forming the tire, portions thereof being broken away for purposes of illustration.

The numeral 1 represents the body of the tire which may be made of any suitable vulcanizable material. This body is surrounded by a number of layers of tape 2 capable of being vulcanized into one piece with the body of the tire. The tread portion has a heavy breaker strip portion 3 around which passes one of the layers of tape 2 and on the outside there is another tread portion 4 to come in contact with the road, another portion of the diagonal strips passing within the breaker strips 5.

The base of the tire is made inextensible in a well known manner by the use of a series of wires or cables 5 embedded therein and around which the tape 2 passes. The tape 2 is made up of a series of longitudinally extending wires 8, said wires being woven together by means of an asbestos thread 9 to form a wire and asbestos tape, which tape is absorbent and is filled with a body of rubber material 10 so that each tape is made up of a series of longitudinal strands of suitable wire, transverse strands of absorbent asbestos and filling in the asbestos with rubber. This tape is wound around the tire diagonally in both directions and is then vulcanized in the tire in the usual manner. An advantage of the form of tape herein described lies in the fact that the asbestos forms a binder to hold the longitudinal wires together and forms an absorbent body for the liquid rubber compound forced thereinto, thereby producing a tape capable of great longitudinal strength, while it is held together by a material which is unaffected by heat in the vulcanizing process and unaffected by the heat of road driving as well. Such a number of layers of the wire and asbestos tape to make up a tire of the desired thickness may be used as the tire sizes require. Inasmuch as the wire tape is put on with the wire strands extending diagonally of the tread of the tire, it gives ample resiliency without unduly straining or bending the wires within the tape.

Having thus described my invention what I claim as new and desire to secure by Letters Patent of the United States, is as follows, modifications within the scope of the claim being expressly reserved:

In a pneumatic tire, a tire body, said tire body having a breaker strip portion and tension members comprising layers of tape extending diagonally across the tread of the tire above and below the breaker strip portion, each tape being made up of a series of continuous bands made of metal wires and asbestos thread holding said wires together, and rubber impregnating the asbestos threads and breaker strips and vulcanized into the body of the tire.

In testimony whereof I have hereunto set my hand this 29th day of January, A. D. 1914, in the presence of the two subscribed witnesses.

HUGH D. PEASLEE.

Witnesses:
O. P. BEAR,
J. J. HERTWECK.